Jan. 15, 1963     H. S. TOCZYLOWSKI     3,073,211
RANGEFINDER-SIGHTS Filed Oct. 13, 1958     7 Sheets-Sheet 1

INVENTOR:
H.S. TOCZYLOWSKI

*Fetherstonhaugh & Co.*

By     *Attorneys*

Jan. 15, 1963   H. S. TOCZYLOWSKI   3,073,211
RANGEFINDER-SIGHTS

Filed Oct. 13, 1958   7 Sheets-Sheet 2

INVENTOR:
H.S. TOCZYLOWSKI

Attorneys

Jan. 15, 1963 H. S. TOCZYLOWSKI 3,073,211
RANGEFINDER-SIGHTS

Filed Oct. 13, 1958 7 Sheets-Sheet 3

INVENTOR:
H.S. TOCZYLOWSKI

By Fetherstonhaugh & Co.
Attorneys

Jan. 15, 1963     H. S. TOCZYLOWSKI     3,073,211
RANGEFINDER-SIGHTS Filed Oct. 13, 1958     7 Sheets-Sheet 4

INVENTOR:
H.S. TOCZYLOWSKI

By Fetherstonhaugh & Co.
Attorneys

INVENTOR:
H. S. TOCZYLOWSKI

Jan. 15, 1963   H. S. TOCZYLOWSKI   3,073,211
RANGEFINDER-SIGHTS
Filed Oct. 13, 1958   7 Sheets-Sheet 6

INVENTOR
H.S. TOCZYLOWSKI

By Featherstonhaugh & Co.

Attorneys

Jan. 15, 1963 H. S. TOCZYLOWSKI 3,073,211
RANGEFINDER-SIGHTS
Filed Oct. 13, 1958 7 Sheets-Sheet 7

INVENTOR:
H.S. TOCZYLOWSKI

By Fetherstonhaugh & Co.
Attorneys

United States Patent Office 3,073,211
Patented Jan. 15, 1963

3,073,211
RANGEFINDER-SIGHTS
Henryk Stanislaw Toczylowski, 5250 Mariette Ave.,
Montreal, Quebec, Canada
Filed Oct. 13, 1958, Ser. No. 766,767
5 Claims. (Cl. 88—2.7)

This invention relates to optical rangefinder-sights, whereby are meant instruments clamped to the barrel of a firing weapon which perform simultaneously the dual function of determining the range to a target and of providing for a suitable tangent elevation angle between the line-of-aim and the axis of the barrel as required for scoring a hit at the target.

The present application is a continuation-in-part of my co-pending application Serial No. 475,522, filed December 15, 1954, now abandoned.

A specific tangent elevation angle is required for any given range to compensate for the fall of the projectile when in flight between the muzzle of the weapon and the target. Consequently the rangefinder-sights known to prior art provide for a specific and unique angular relationship between the barrel and the line-of-aim for any range determined by the setting of the ranging system of the rangefinder-sight; said relationship being determined by the ballistic properties of the weapon and ammunition for which the rangefinder-sight is designed.

Consequently the rangefinder-sight cannot function properly when the ballistics of the weapon and ammunition change, unless some facility is incorporated in the rangefinder-sight which would make it possible, for a given range, to alter the angular relationship between the line-of-aim and the barrel so as to obtain a tangent elevation angle to fit the changed ballistics. The new ballistics must be known beforehand. Facilities of this nature are incorporated in some rangefinder-sights known to prior art, more specifically for the purpose of catering for changes in the ballistics of the weapon resulting from the use of different kinds of ammunition.

It can be broadly stated that a rangefinder-sight of which many varieties are known consists essentially of three elements; one is the rangefinding system, the second is the sighting system and the third is a mechanism linking the rangefinding system with the sighting system. The latter element is omitted in some types of rangefinder-sights.

The purpose of the rangefinding system, of which many varieties are known, is to present to the operator an image or images of the target in such a manner that the aspect of said image or images—for a given setting of said system—depends upon the range. The ranging is then accomplished by operating the controls of the system until the image (or images) of the target is brought to a prescribed aspect whereupon the range can be determined from the position of the control at which the prescribed aspect of the image of the target is obtained.

The purpose of the sighting system, which can be either of the telescopic or else of the open-sight variety, is to establish a line-of-aim running through said sighting system between the eye of the operator and the target and remaining in a specific angular relationship with the axis of the barrel of the weapon to which the rangefinder-sight is clamped.

The purpose of the linking mechanism is to vary said angular relationship between the line-of-aim and the barrel, according to the setting of the controls of the rangefinding system, in such a manner as to obtain the tangent elevation angle required by the ballistic of the weapon and ammunition to score a hit at a target, located at the range determined by the setting of the ranging system of the instrument.

Now the object of my invention is to improve the rangefinder-sights known to prior art by providing a novel and more convenient means of catering for a plurality of ballistics of the weapon to which the rangefinder-sight is clamped. This is achieved by effecting the ranging system of the rangefinder-sight while the sighting system and the mechanical link between the ranging and sighting systems are left undisturbed.

Furthermore, as will be explained hereafter, the improvement according to my invention provides—for a given range—a selection of an infinite number of tangent elevation angles between fixed limits set by the design of the rangefinder-sight. This is of particular value for coping with ballistic changes due to a factor which might vary continuously, such as the temperature of the propellant charge.

The many types of rangefinder-sights known to prior art, as defined above, are usually classified according to the type of rangefinding system used and can be therefore divided into two broad classes, namely image-coincidence instruments and stereoscopic instruments. There also exists a group of rangefinder-sights which operate on the image-distortion principle. In these instruments, and also in some rangefinder-sights of the stereoscopic variety, the ranging and sighting systems are fused into one.

A characteristic feature of the improvement according to my invention is that it may be applied to any type of rangefinder-sight known to prior art. To illustrate this point, in the following detailed description, my invention will be exemplified as applied to three specific rangefinder-sights of which one is of the image-coincidence type, one of the image-distortion type and one of the stereoscopic type; this on the understanding that this method of presentation should in no way be construed as restricting the application of the invention to the three instruments to be described in detail.

With reference to the accompanying drawings.

Figure 1:
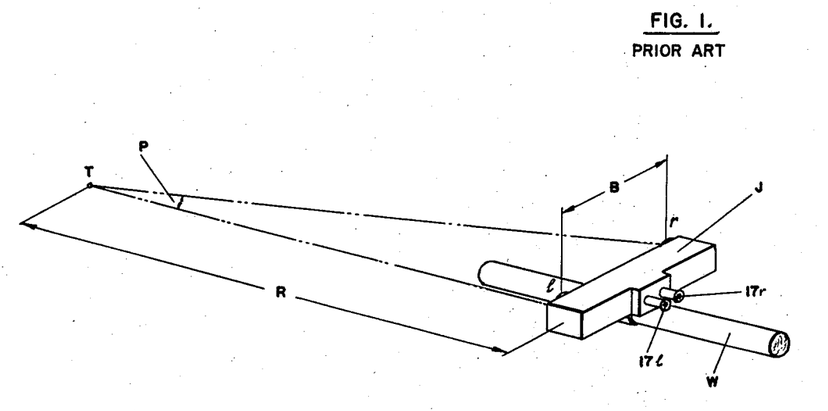
FIG. 1 is a perspective view of a rangefinder-sight mounted on the barrel of a firing weapon and trained at a target.

With reference to FIG. 1, J is the rangefinder-sight in the form of an oblong box mounted athwart the barrel W of a firing weapon trained at a target T located at a range R. The rays of light emanating from the target enter the instrument through a pair of windows $l$ and $r$ whose spacing B is the base of the instrument. In FIG. 1 and in other drawings to be discussed subsequently, the rangefinder-sight is mounted on the weapon in such a manner that the base of the instrument is horizontal; however, the invention is equally applicable to rangefinder-sights with a vertical base.

The parallax angle $p$ which is the angle subtended by the base B of the instrument when viewed from the target T depends upon the range R so that the range can be determined by measuring $p$ if B is known. The above quantities are linked by the relation:

$$R = q \cdot \frac{B}{p} \qquad (1)$$

In the above equation, which is valid for small angles, $p$, $q$ is a constant coefficient depending on the units used. For instance, if the length of the base B is expressed in inches and the parallax angle $p$ is expressed in angular mils, then—in order to get the range R in metres—the value of $q$ must be: $q = 25.4$ millimetres per inch. The above equation is the fundamental equation of all rangefinders; they differ in the manner in which the parallax angle $p$ is determined.

Figure 2A:
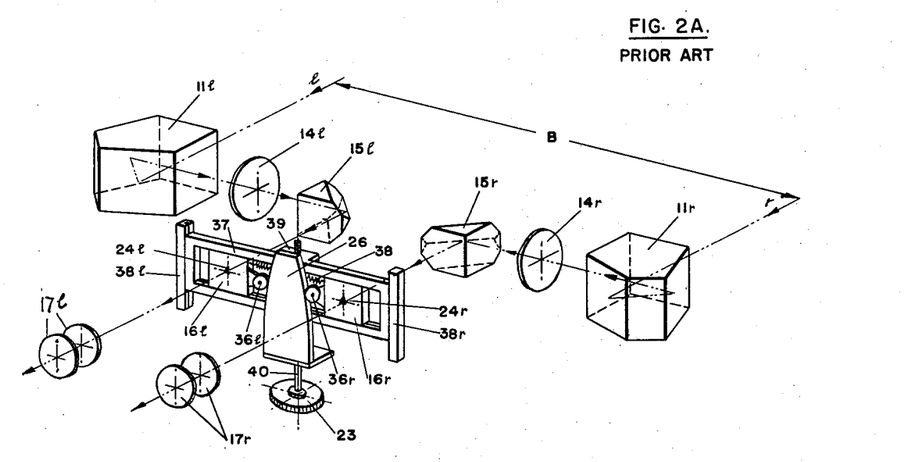
FIG. 2A is a perspective view of the optical system and of the ranging and sighting mechanisms of one of the stereoscopic rangefinder-sights known to prior art, to which my invention can be applied.
Figure 2B:
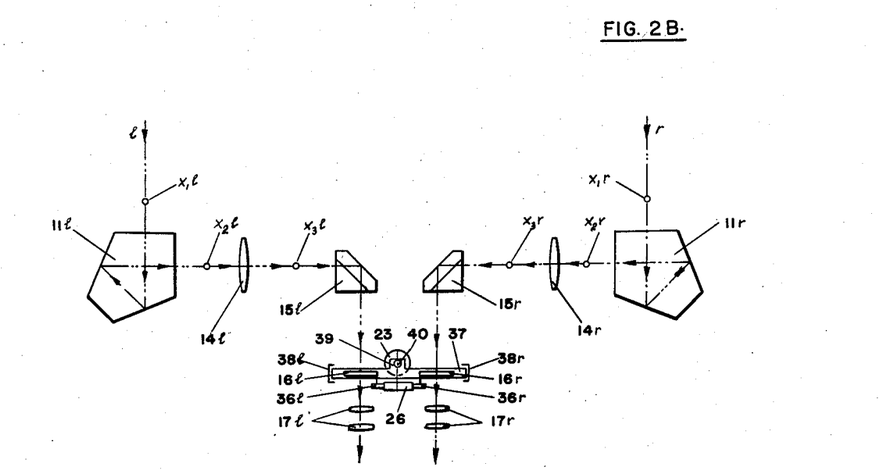
FIG. 2B is a plan view of the optical system and of the elevating mechanism of the instrument of FIG. 2A on which the possible locations of the additional element to be added according to my invention are indicated.

With reference to FIGS. 2A and 2B, the beams of light $l$ and $r$ emanating from the target enter the left and right pentaprisms 11$l$ and 11$r$ respectively where each beam suffers two consecutive reflections. The spacing B of the pentaprisms is the base of the rangefinder. When emerging from the pentaprisms the beams are directed towards each other; they are collimated in objective lenses 14$l$ and 14$r$ and enter a pair of roof prisms 15$l$ and 15$r$ whose purpose is to swing each beam over 90 degrees and also to restore the images of the target which become inverted by the objective.

On emerging from the roof prisms the two beams form each an image of the target on the reticle 16$l$ and 16$r$ respectively located in the focal plane of the objectives. The two images of the target thus formed on the reticles 16$l$ and 16$r$ are viewed by the left and right eye of the operator via a pair of eyepieces 17$l$ and 17$r$. The eyepieces protrude slightly from the body of the instrument as shown in FIG. 1 for the convenience of the operator.

The combined effect of the spacing B of the entrance windows of the instrument and of the magnification of the telescopes incorporated in the optical systems associated with each eye is to increase virtually the eye spacing of the observer and thereby to increase his perception of depth.

The latter is the result of a subconscious process in the mind of the observer whereby the two images of the target, each viewed by one eye, are fused into one and a sense of distance is obtained according to the angular spacing between the two images corresponding to the parallax angle $p$ of FIG. 1.

Now if two identical markers 24$l$ and 24$r$ are arranged, one on each reticle 16$l$ and 16$r$ respectively, then the operator will have the illusion of one marker being present in his three-dimensional field of vision. This marker may appear nearer or farther away than the target T, according to the spacing of the markers 24$l$ and 24$r$ on the two reticles.

It follows that if the spacing between the reticles with markers is varied, the operator will have the illusion of the single marker seen in three-dimensional space approaching or receding, according to whether the spacing of the actual markers is decreased or increased, and the apparent range of the virtual marker seen by the operator is a function of the spacing of the two reticles.

In the instrument portrayed in FIG. 2 the two reticles are fitted each with a roller 36$r$, 36$l$ and are slidably mounted in a frame 37 so that their horizontal spacing can vary. The reticles are connected by a spiral spring 38 which urges them to converge by sliding along the frame while a cam 26, wedged between the reticle rollers, counteracts the action of the spring by pushing them apart. The reticle-carrying frame 37 is held between a pair of fixed vertical arms 38$l$ and 38$r$ forming a pair of runners between which the frame 37 can slide vertically.

A vertical shaft 40, fitted with a control knob 23 at the lower end, is rotatably fixed in the horizontal base so that it cannot move vertically. The details of its fixing, which is conventional, are not shown in FIG. 2A. The upper end of the shaft 40 is threaded and so is a mating hole in a bulge 39 of the frame 37. Therefore, when the knob 23 is rotated, the shaft 40 and frame 37 act on the screw-and-nut principle and the frame moves vertically up or down, depending on whether the knob 23 is rotated clockwise or anticlockwise. The vertical displacement of the frame 37 causes the horizontal spacing of the markers 24$l$ and 24$r$ to change, because of the action of the cam and rollers.

It follows that the horizontal spacing of the reticle markers 24$l$ and 24$r$, which determines the apparent range of the virtual single marker in the three-dimensional field of vision of the operator, depends on the level of the markers in a manner determined by the shape of the cam. In turn the line-of-sight running to the target via the reticle markers determines a specific tangent elevation angle of the firing weapon to which the instrument is rigidly clamped.

It also follows that by suitably shaping the cam 26, it is possible to establish a relationship between the apparent range of the single marker in the field of vision of the operator and the corresponding tangent elevation of the barrel which will fit the ballistics of the weapon. If this is done, the work of the operator is reduced to three consecutive steps: first—to operate the control knob 23 to match the adjustable apparent range of the single virtual marker with that of the target, second—to lay the weapon so as to place the image of the marker squarely on the image of the target, third—to pull the trigger.

Most stereoscopic rangefinder-sights operate on the above principle, although they differ in the arrangement of details of the mechanism which causes the apparent distance to the virtual single marker to vary.

In some rangefinder-sights known to prior art the process is reversed: the horizontal spacing of the two markers on the reticles does not change, so that the apparent range of the single virtual marker present in the field of vision of the operator remains fixed. On the other hand means are provided for deviating slightly one of the beams of light in the horizontal plane, whereby all the actual objects viewed by the operator seem to approach or recede and ranging is done by matching the variable apparent range of the target with the fixed apparent range of the single marker.

As will be explained hereafter, the improvement according to my invention is equally applicable to both families of stereoscopic rangefinder-sights discussed above and known to prior art.

Figure 3:
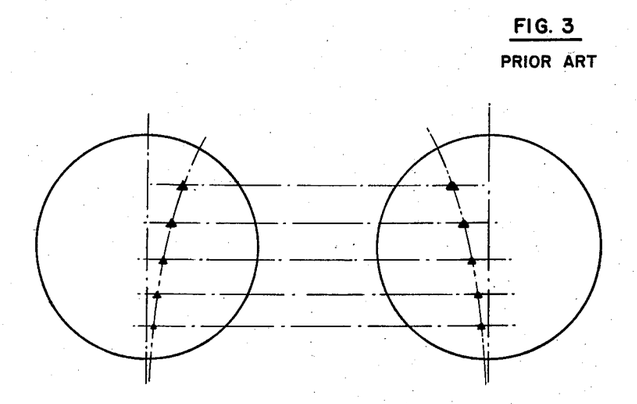
FIG. 3 is a diagrammatic view of the reticles in an alternative stereoscopic rangefinder-sight to which my invention can be applied.

There is yet another stereoscopic rangefinder-sight known to prior art to which the improvement according to the present invention can be applied. The optical system of this instrument is identical to that portrayed in FIGS. 2A and 2B except that the two movable reticles carrying each one marker are replaced by two fixed reticles each carrying a pattern in the form of a train of markers as shown in FIG. 3. Consequently the mechanism is omitted altogether so that the instrument features no moving parts.

With reference to FIG. 3 the markers are arranged in pairs. Each pair of markers appears at a different level and has a different spacing, so that as a result, a train of virtual markers, each located at a different height and at a different apparent range, is present in the field of vision of the operator. The apparent ranges and heights of these virtual markers are so related to the ballistics of the weapon that the three-dimensional locus of the train of markers presented to the operator follows the line-of-flight of the projectile. Consequently the function of the operator is to train the weapon in azimuth and elevation in such a manner as to "thread" through the image of the target, the line-of-flight of the projectile determined by the train of markers present in the field of vision.

Figure 4:
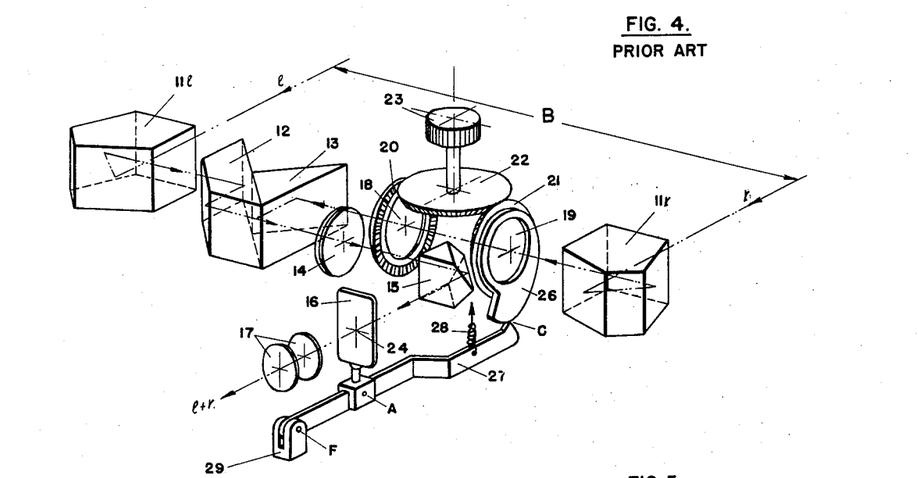
FIG. 4 is a perspective view of the optical system and of the ranging and sighting mechanisms of one of the rangefinder-sights of the image-coincidence variety known to prior art to which my invention can be applied.
Figure 5:
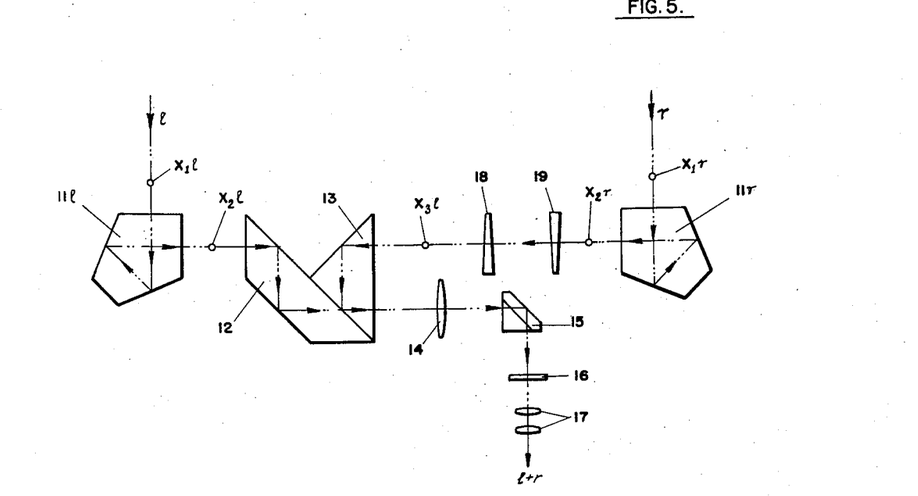
FIG. 5 is a plan view of the optical system of the instrument of FIG. 4 showing the possible locations of the additional element to be added according to my invention.

In FIGS. 4 and 5, which refer to a rangefinder-sight of the overlapping-image variety known to prior art, $l$ and $r$ are again two beams of light emanating from the target and 11$l$ and 11$r$ are two pentaprisms whose spacing B is the base of the instrument.

After emerging from the pentaprisms the beams are directed towards each other and enter a beam-combining element consisting of a pair of prisms 12 and 13 with a semitransparent interface.

Beam $l$ suffers two consecutive reflections in prism 12; when it strikes the interface between prisms 12 and 13 it is partly reflected and partly transmitted. The reflected part is lost, the transmitted one is utilized in a manner described hereafter.

Beam $r$ strikes the interface after suffering only one reflection in prism 13. Again it is partly reflected and partly transmitted, but this time the transmitted portion is lost and the reflected one is utilised.

The useful portions of the beams $l$ and $r$ are thus combined on the semi-transparent interface. That is, they henceforth follow a common optical path which is designated $l+r$ in FIGS. 4 and 5.

The combined beam $l+r$ is then collimated in an objective lens 14 to form two overlapping images of the target on the reticle 16 located in the focal plane of the objective.

The purpose of the roof prism, which is located along the path of the beam $l+r$ between the objective 14 and the reticle 16, is to swing the beam over 90 degrees and also to restore the images of the target which become inverted by the objective. The two images of the target thus formed on the reticle 16 are viewed by the operator via an eyepiece 17.

Figures 7, 8:
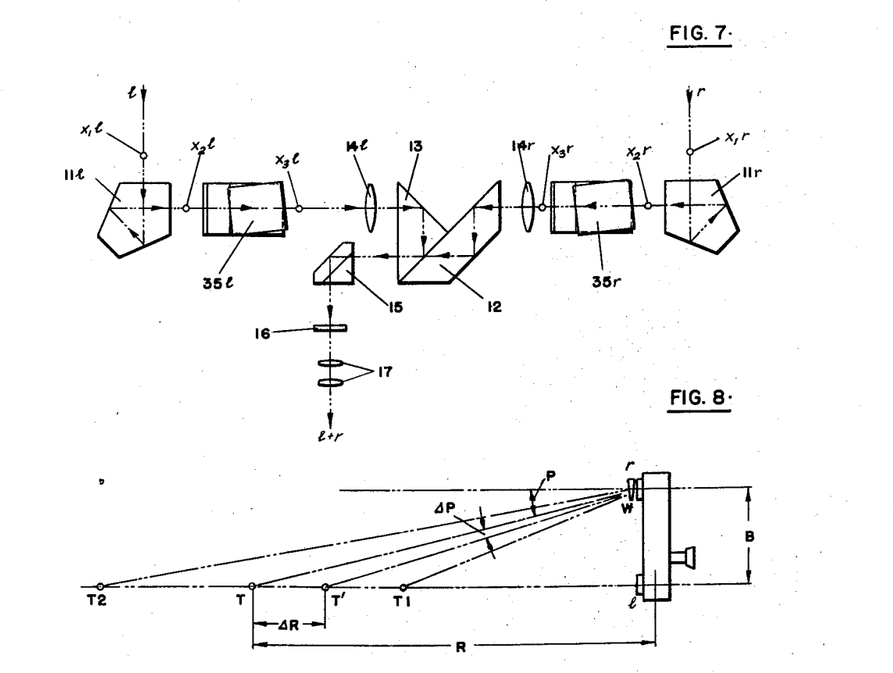
FIG. 7 is a plan view of the optical system of the instrument portrayed in FIG. 6 on which possible locations of the additional element according to my invention are indicated.
FIG. 8 is a diagrammatic plan view of a rangefinder-sight trained at a target which illustrates the principle of operation of the improvement according to my invention.

With reference to FIG. 8 which shows a rangefinder-sight trained at a target T located at a range R, the image of the target formed by the beam associated with the window $r$ appears to the right of that formed by the beam associated with the window $l$ if the distance to the point T1 of intersection of the optical axes of the systems associated with the windows $l$ and $r$ is shorter than the range R of the target. The position of the two images is reversed if the point of intersection T2 of the two optical axes is located behind the target T. Finally the two images of the target coincide if the two optical axes intersect at the target.

In order to be able to vary the parallax angle $p$, an adjustable optical deviator must be placed in the path of one of the beams $l$ or $r$ so as to deflect the beam horizontally in a known and measurable manner.

In the instrument shown in FIGS. 4 and 5 this deviator is in the form of a pair of identical optical wedges 18 and 19 placed in the path of the beam $r$. These wedges are mounted in circular frames fitted each with a conical gear 20 and 21. These gears are meshed with another conical gear 22 driven by a hand-operated knob 23 which is mounted on a shaft protruding from the casing of the instrument so that it is accessible to the operator.

It is seen that when the knob 23 is rotated the wedges 18 and 19 rotate by the same amount in opposite directions. In the neutral position of the deviator the wedges 18 and 19 are mounted so that the taper of one points upwards and that of the other downwards. Thus one deflects the beam upwards and the other downwards by the same angle and the beam remains undeflected after passing through both wedges.

Now if a wedge is rotated its deflection angle can be resolved in two components: one vertical, the other horizontal. The former decreases and the other increases as the rotation angle of the wedge increases. By rotating simultaneously the two identical wedges over equal angles, one clockwise and the other anticlockwise, as described above, the vertical components of the deviation angles remain equal and directed opposite each other while the horizontal components also remain equal but are pointing in the same direction so that they add up and the total effect is a horizontal deviation of the beam $r$ by an amount depending upon the rotation angle of the knob 23 and in a direction depending upon the direction of rotation of said knob.

In conventional rangefinders the knob 23 (or another moving part of the deviator) is associated with a scale and pointer calibrated directly in terms of range of the target.

The purpose of a rangefinder-sight is to obtain a proper elevation of the barrel of a firing weapon as required by the ballistics of the weapon for the range determined by the rangefinder-sight. For this purpose the reticle 16 is fitted with an aiming haircross 24 and the instrument is clamped athwart the barrel of the weapon so that the line of sight of the instrument and the axis of the weapon point to the same azimuth and the vertical angle between the two is varied in a manner corresponding to the variations of the tangent elevation with range.

To this end the mechanism of the optical deviator is made to drive another mechanism which changes the tangent elevation angle of the sighting system. For instance in some rangefinder-sights known to prior art the required variation of the tangent elevation angle is accomplished by suitably tilting the instrument with respect to the barrel of the weapon.

The instrument portrayed in FIG. 4 is rigidly mounted on the weapon and the required variation of the tangent elevation is accomplished by a vertical displacement of the aiming haircross by a suitable amount so that the angular change of the tangent elevation is the product of the reticle displacement by the focal distance of the objective.

In FIG. 4 this is accomplished by fitting the rotatable frame 21 of the wedge 19 with a suitably shaped cam 26 cut to fit the ballistic curve of the weapon. The cam acts upon a lever 27 to which the reticle is attached at a point marked A. The reticle can slide up or down between suitable guides which are not shown on FIG. 4. The lever is pivoted at a fulcrum F and the point of contact between the cam and the lever is marked C. A spring 28 pulls the lever 27 upwards and thereby ensures a positive contact with cam 26 at point C.

A possible change of the range R to the target is taken care of by a rotation of the deviator by an angle required to restore image coincidence. This in turn results in a displacement of the point C and of a displacement of point A and of the reticle.

The cam 26 is so shaped that when the instrument, which is rigidly clamped to the firing weapon, is trained so as to align the image of the target with the haircross—the resultant tangent elevation is that which is required by the ballistics at a new range. This condition is fulfilled at all operational ranges.

Figure 6:
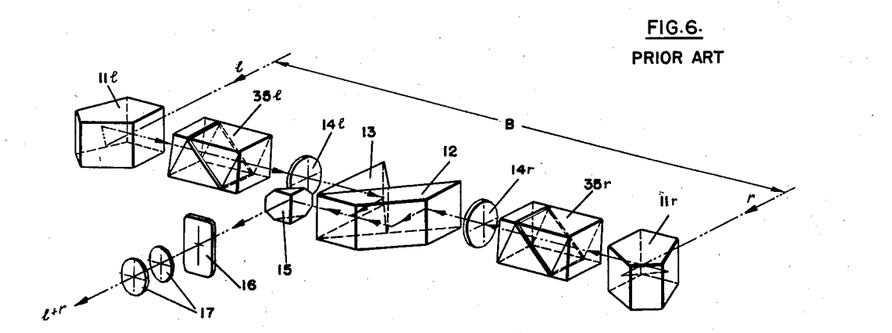
FIG. 6 is a perspective view of the optical system of a rangefinder-sight of the image-distortion variety known to prior art to which my invention can be applied.

Another embodiment of a rangefinder-sight known to prior art is illustrated in FIGS. 6 and 7. The two beams of light emanating from the target are again designated $l$ and $r$. Upon entering the instrument they are rotated by 90 degrees by suffering each a double reflection in one of a pair of pentaprisms designated 11$l$ and 11$r$ respectively. The spacing of these prisms, B, is the base length of the instrument. Each beam is then collimated in an objective lens designated 14$l$ and 14$r$ whereupon the two beams are combined in a pair of cemented prisms 12 and 13 with a semi-transparent interface.

The operation of these prisms is analogous to that of the combining prisms of the instrument already discussed with reference to FIGS. 4 and 5. From then onward the two beams follow a common path via a rectifying roof prism 15 to form each an image of the target on a reticle 16. These two images are viewed by the operator through an eyepiece 17. The field of vision presented to the operator is shown diagrammatically in FIG. 9 in which the images of a target located at a range $R_1$ and formed by the beams $l$ and $r$ of FIGS. 6 and 7 are designated $T_1l$ and $T_1r$ respectively.

In order to make ranging possible an image-distorting optical element is inserted in the path of each of the two light beams between the pentaprisms and the objective. These elements are shown in FIGS. 6 and 7 and are designated 35$l$ and 35$r$ respectively. Each consists of two prisms, or—more specifically—of two pairs of cemented prisms chromatically compensated and separated by a thin interval. In each element one prism (or more specifically one pair of prisms) is slightly rotated about a vertical axis with respect to the other in a manner clearly indicated in FIG. 6.

When going through the first prism (or more specifically the first pair of prisms) of the element 35$r$ the luminous beam $r$ suffers two successive refractions: one at the entrance, the other at the exit surface so that upon leaving the prism it is deflected both horizontally and vertically when compared with its initial direction. This is repeated when the beam $r$ passes in turn through the second prism (or more specifically through the second pair of prisms) of the element 35$r$. It is obvious from the configuration of the element 35$r$ that the two successive vertical deflections of the beam very nearly cancel each other, while the horizontal deflections add. Thus the net result of the element 35$r$ is that it practically does not deflect the beam $r$ in the vertical plane but does deflect it in a horizontal plane by an angle which—for a given configuration of the element 35$r$—depends upon the elevation angle of the incident beam $r$.

Very much the same happens to the left-hand-side beam $l$ when going through the element 35$l$: it suffers practically no vertical deflection, but is deflected horizontally by an angle depending on the elevation angle of the incident beam. Moreover it is seen from FIG. 7 that the two deflecting elements 35$r$ and 35$l$ are so arranged that they produce opposite horizontal deflections of their respective beams, that is, if one of the beams $l$ and $r$ is deflected to the right, the other is deflected to the left.

Figure 9:
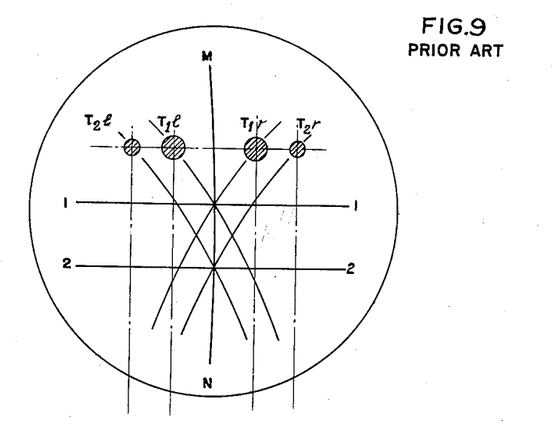
FIG. 9 is a diagram showing the field of vision of an image-distortion rangefinder-sight known to prior art and portrayed in FIGS. 6 and 7 when this instrument is trained at a target.

The effect of the above upon the images of the target presented to the operator in the field of vision of the instrument is best illustrated by consulting FIG. 9. It is supposed that the rangefinder-sight is rigidly clamped athwart the barrel of a firing weapon and that the latter is trained at a target T located at a range $R_1$. The images of the target formed on the reticle by the beams $r$ and $l$ are designated $T_1r$ and $T_1l$. Their spacing is—of course—determined by the range $R_1$.

Suppose now that the barrel of the weapon, together with the instrument which remains rigidly clamped athwart it, is swung in the vertical plane running through the target so as to change the tangent elevation angle of the barrel.

The image $T_1r$ will then drift upwards or downwards in the field of vision but—because of the variable horizontal deviation produced by the element 35$r$—it will not move vertically but will follow a curvilinear track shown by a solid line on FIG. 9. The shape of this track is determined by the horizontal deviating properties of the element 35$r$. Likewise the image $T_1$ will follow a curvilinear track determined by the properties of the deviating element 35$l$.

It is clearly seen from FIG. 9 that the two tracks intersect at a level marked 1—1. Since the initial spacing between the images $T_1r$ and $T_1l$ was determined by the range $R_1$ of the target, it follows that 1—1 is the level at which the image-coincidence will occur for any target located at the range $R_1$.

Suppose now that the barrel of the weapon reverts to its original position and that the target recedes so that its range is increased from $R_1$ to $R_2$. The two images of the target are now designated $T_2l$ and $T_2r$, and the spacing between them has increased because the target is more distant. It is seen that if the tangent elevation of the weapon is now varied, the two images will again follow their curvilinear tracks and will be brought into coincidence at a level 2—2 corresponding to the new range $R_2$. Thus the levels 1—1, 2—2 . . . etc. in the field of vision at which image coincidence occurs correspond each to a specific range $R_1$, $R_2$ . . . etc. They can be labelled accordingly and the instrument described becomes a rangefinder of the image-distortion type.

Each level 1—1, 2—2 . . . etc. corresponds to a specific tangent elevation of the weapon. The distribution of these levels, i.e., the values of the tangent elevation angle corresponding to each range, depends upon the design and arrangement of the image-distortion elements 35$r$ and 35$l$ and can be made to coincide with or to approximate very accurately the tangent elevation required by the ballistics of the weapon and ammunition, in which case the instrument described becomes a rangefinder-sight of the image-distortion type.

The line M—N on FIG. 9 is the locus of points of coincidence of the images of the target for a properly boresighted instrument that is when the barrel of the firing weapon remains in the vertical plane of the target. Consequently, M—N is the aiming line of the image-distortion rangefinder-sight which replaces the aiming haircross of the instrument similar to that discussed above with reference to FIGS. 4 and 5. In general, the curvilinear tracks of the images T1, T2 . . . etc. in FIG. 9 need not be mirror replicas of the corresponding tracks of the images $T_1r$, $T_2r$ . . . etc. so that—in general—the aiming line need not be straight.

The purpose of the above analysis is to provide a broad survey of rangefinder-sights known to prior art by discussing in some detail at least one instrument belonging to each of the main categories: stereoscopic, image-coincidence and image-distortion and to emphasize their common feature which is that they provide one and only one tangent elevation angle for any given range so that they can cater only to one given set of ballistics properties of the associated weapon and ammunition and therefore they become useless when the ballistics change.

Some earlier inventors have perceived this drawback and—in order to obviate it—have proposed either to use a plurality of interchangeable cams or else to mount the cam on a hinge so that its general slope could be varied; or else they have proposed a flexible cam with a variable curvature.

According to another invention made by myself, for which the application is co-pending Serial No. 475,522, now abandoned, the changing of the tangent elevation angle obtained by ranging with an image-coincidence rangefinder-sight is achieved by varying the transfer ratio of the mechanism linking the ranging system with the sighting system.

These designs have several drawbacks: Interchangeable cams have the disadvantage of requiring a new cam for each set of ballistic conditions which leads to a plurality of cams. Flexible and hinged cams, known to prior art, are free of this limitation but their manufacture and calibration is expensive. Moreover, none of the methods known to prior art is applicable to the image-distortion rangefinder-sights or to the kind of steroscopic rangefinder-sights discussed with reference to FIG. 3.

The present invention is directed towards providing an improvement applicable to all rangefinder-sights known to prior art so as to convert them into instruments which could cater to a plurality of ballistics without it being necessary to alter or complicate the mechanisms of the instrument.

The novel idea, which is at the base of the present invention, is to alter the ballistics for which the instrument caters by altering the deviating angle $p$ of the ranging system of the rangefinder-sight by a suitable increment $\Delta p$.

According to the present invention the required adjustable increment $\Delta p$ of the deviation angle $p$ is achieved by placing an adjustable horizontally deflecting optical element such as a wedge in the path of one of the light beams $l$ or $r$ of a rangefinder sight. An element of this sort placed in front of the right-hand-side window of the rangefinder-sight and designated $w$ is shown in FIG. 8.

In fact this element need not necessarily be placed in front of the window; it can also be placed inside the instrument. Its possible locations along the path of the luminous beam $r$ of the instruments discussed with reference to FIGS. 2, 4, 5, 6 and 7 are shown in FIGS. 2B, 5 and 7 and are designated $X_1r$, $X_2r$, $X_3r$. Or else it can be placed along the path of the beam $l$, the relevant locations are designated $X_1l$, $X_2l$, $X_3l$.

In either case the presence of an additional horizontally deflecting optical deviator in one of the two beams of light will bodily shift the image formed by said beam towards or away from the image formed by the other beam according to the direction in which the beam is additionally deflected.

In stereoscopic rangefinder-sights, such as exemplified in FIGS. 2A, 2B and 3, this will result in an apparent approaching or receding of the three-dimensional image of the field of vision presented to the operator while the apparent distance to the marker or markers as determined by the spacing of the two reticles remains the same. Consequently the mechanism of the instrument shown on FIGS. 2A and 2B will have to be manipulated in order to match the apparent distance to the marker with the new apparent distance to the target and thereby the tangent elevation angle will be changed. Likewise the tangent elevation angle of the instrument discussed with reference to FIG. 3 will have to be altered to "thread" the line-of-flight of the projectile through the image of the target which has now approached or receded. By suitably selecting the increment $\Delta p$ of the deviation angle, an increment of the tangent elevation angle to fit the new ballistics can thus be achieved.

In image-coincidence rangefinder-sights (see FIGS. 4 and 5) the bodily horizontal shift of one of the two images of the target will bring it out of line with the other image and again the mechanism of the instrument will have to be manipulated and thereby the tangent elevation angle changed in order to restore image coincidence.

Figure 10:
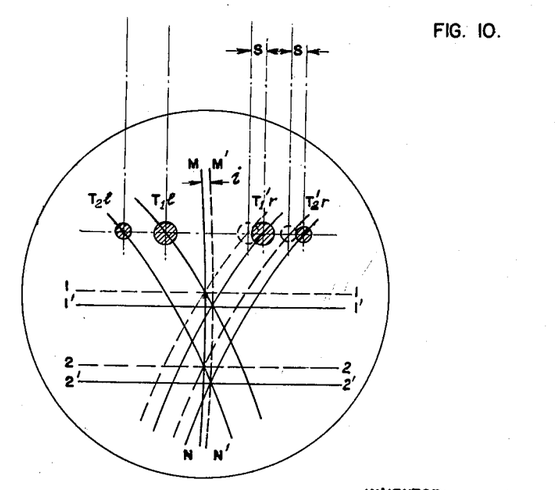
FIG. 10 is a diagram showing the changes in the field of vision portrayed in FIG. 9 when the instrument is supplemented to incorporate the improvement according to the present invention.

The effect of applying my invention to the image-distortion rangefinder-sight portrayed in FIGS. 6, 7 and 9 is best explained with reference to FIG. 10. Suppose that the additional deviator $\Delta p$ is placed in the right-hand-side luminous beam of the instrument and results in a linear shift of the relevant image of the target over a distance S so that the image $T_1r$ (or $T_2r$) moves to $T_1'r$ ($T_2'r$). It is readily seen that the levels at which image coincidence occurs are now 1'—1' instead of 1—1 (or 2'—2') instead of 2—2, so that the tangent elevation angle corresponding to any given range is changed and it is again possible to select the deviation $\Delta p$ to fit the given change in ballistics.

The present invention has a certain imperfection which can be best explained by referring again to FIG. 10. It is seen that the locus of points of intersection of the two images of the target lies now no longer along the solid line MN but along the interrupted line M'N' which is laterally displaced by a small amount designated "$i$" on FIG. 10. This represents an azimuthal error in training the weapon which results when my invention is applied, unless two adjustable deviators are used, one in each of the two beams of light of the instrument and unless the required angular increment $\Delta p$ of the deviation angle of the instrument is evenly split between the two deviators. It is readily seen that the same occurs when my invention is applied to the image-coincidence rangefinder-sights already discussed with reference to FIGS. 4 and 5 while the stereoscopic instrument of FIGS. 2A and 2B is free of this imperfection if the cam consists of a pair of symmetrical profiles.

I have found that the resultant azimuthal error in training the weapon is so small that it does not warrant the use of two additional deviators instead of one only and does not invalidate the practical value of my invention.

Having thus explained the principle of operation of the improvement according to my invention, it is fitting to discuss in detail the design of one of its embodiments.

It has been already stated that any conventional optical deviator, capable of deflecting the beam horizontally by an adjustable angular amount $\Delta p$, could be fitted into a rangefinder-sight to provide the improvement according to the present invention and an adjustable wedge was mentioned as one device which can perform this function and which is preferred because of its simplicity and convenience. Consequently the additional deviator in the form of an optical wedge or a pair of wedges will be described.

In submitting the following description the inventor is anxious to emphasize that he is fully aware of the fact that beam-deflecting properties of wedge-shaped transparent bodies whose refractive index differs from that of the ambient medium are well known, so that optical wedges are not patentable per se. What is claimed to be novel is the advantage taken of the known properties of wedges for solving a given technical problem in a manner which is new to the art and incorporates a creative idea.

One possible embodiment of my invention consists in fitting any one of the rangefinder-sights discussed with reference to FIGS. 2A, 2B, 3, 4, 5, 6 and 7 with an additional deviator illustrated in FIG. 17 and consisting of a pair of identical counter-rotating optical wedges similar to those designated as items 18 and 19 in FIG. 4 and to use a similar mechanism to that comprising items 20, 21, 22, 23 on FIG. 4 to rotate them.

Figure 17:
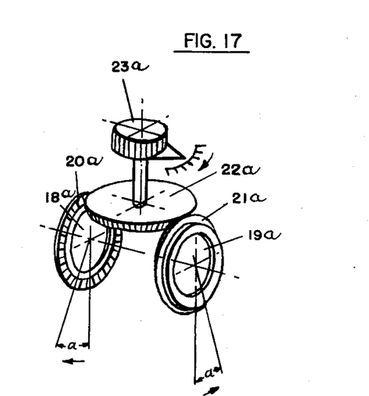
FIG. 17 is a diagrammatic view in perspective of a deviator embodied in my invention.

The deviator shown in FIG. 17 may be located in the path of light at any one of the stations $X_1$, $X_2$, $X_3$, left or right, shown in FIGS. 2B, 5 and 7. The deviator comprises a pair of identical wedges 18a and 19a placed in the path of one of the beams of light. These wedges are mounted in circular frames fitted each with a conical gear 20a and 21a. The gears are meshed with a third conical gear 22a disposed between the wedges, said gear 22a is driven by a hand operated knob 23a which is mounted on a shaft so as to be accessible to the operator. It will be seen that, when knob 23a is rotated, the wedges 18a and 19a are rotated through equal segments $a$ in opposite directions.

Suppose that the angular deflection of each wedge is "$d$" and that one of them is rotated over an angle "$a$" clockwise from the reference position in which the wedge tapers upwards, while the other wedge is rotated over an angle "$a$" anticlockwise from the reference position in which the wedge tapers downwards. In this case the horizontal and vertical components of the angular deviation produced by each wedge are defined by:

1st wedge—
    horiz. component $+d.\sin a$
    vert. component $+d.\cos a$ 2nd wedge—
    horiz. component $+d.\sin a$
    vert. component $-d.\cos a$ It is seen that the vertical deviations cancel each other, while the horizontal deviations combine additively to produce a total angular horizontal deflection $\Delta p$ of the beam defined by $$\Delta p = 2d.\sin a \quad (2)$$

Figure 18:
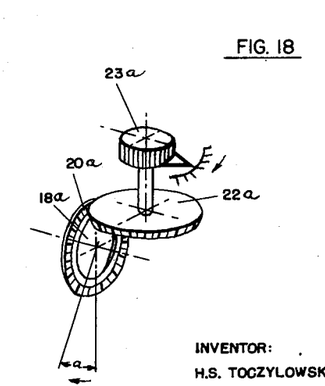
FIG. 18 is a view showing another embodiment of said deviator.

The arrangement described has the merit of performing accurately the required function but is rather complex. It can be replaced by a simplified arrangement in which the second wedge is omitted altogether. This is illustrated in FIG. 18.

In this case the first wedge—when remaining in the reference position in which it tapers downwards—produces a vertical angular deflection "$d$" and consequently lifts bodily the image of the target formed by the beam of light which passes through the wedge. Consequently in order to make the two images level, it becomes necessary to tilt accordingly the pentaprism (item 11 in FIGS. 2, 4, 5, 6, 7) located in the path of the other beam and to immobilize it in this position.

Again when the wedge is rotated over an angle "$a$" the angular horizontal and vertical deviation components of the beam of light are defined by:

horiz. component $+d.\sin a$
    vert. component $+d.\cos a$ It is readily seen that the angle of rotation "$a$" can be kept small if the deviation angle "$d$" of the wedge is made very much larger than the maximum required value of the adjustable angular deflection $\Delta p$ in which case the vertical displacement changes so little that its change be ignored and it is legitimate to express the horizontal deviation by the approximate formula—

$$\Delta p = d.a \quad (3)$$

The control knob of the additional rotatable wedge according to my invention is fitted with a calibrated scale and pointer to ascertain the amount of rotation of the wedge from the reference position. For convenience the scale may not necessarily be calibrated in terms of angular rotation angles "$a$" or in terms of the resultant angular deviation $\Delta p$. It may be calibrated in terms of the change $\Delta e$ of the tangent elevation angle "$e$" obtained by applying the deviation $\Delta p$ in order to take care of the change of ballistics; or else it can be calibrated in terms of the parameter which causes the ballistics to change.

For instance, if the improvement according to my invention is applied to a rangefinder-sight in order to make it suitable for use with several different kinds of ammunition, then the scale can be provided with suitably spaced graduations, each corresponding to a specific kind of ammunition.

Or else the rate of burning of the propellant used in the firing weapon might be affected by the temperature, in which case the muzzle velocity imparted to the projectile would necessarily depend upon the temperature and the ballistics of the weapon and consequently the magnitude of the additional horizontal deviation $\Delta p$ and the corresponding angle of rotation of the wedge become all functions of the propellant temperature. In this case the graduations of the scale of the control mechanism of the additional deviator according to my invention might be arranged and labelled in terms of propellant temperature variations, which cause the ballistics to change.

Another embodiment of the present invention is applicable to rangefinder-sights known to prior art which—because of thermal or mechanical instability of their ranging systems—are fitted with an adjusting device variously designated in the trade as "zero setting" or "infinity alignment" or "field alignment" device.

It is evident with reference to FIGS. 2A, 2B or 6 and 7, that the operation of the ranging system of the instrument will be upset if its body bends slightly in the horizontal plane. Such bending may be caused by mechanical strain or may occur as a result of changes in ambient temperature. The operation of the rangefinder-sight will also be upset if the position of one of the vital elements of its optical system slightly changes with respect to the other elements during the lifetime of the instrument.

The conventional procedure to check whether a rangefinder or rangefinder-sight remains in proper alignment is to train it on a target located at a known range or else at an object, such as a lath, which simulates a target located at a known range, and to check whether the images of the target are presented to the operator in proper relationship for the known range of the actual or simulated target.

The lack of proper relationship indicates the presence of an instrumental error which can be corrected for this particular range—and thereby also presumably be corrected or minimised at other ranges—by bringing the images into proper relationship by a separate adjustable horizontal deviator called "zero adjustment" of infinity alignment or "field alignment."

Figure 11:
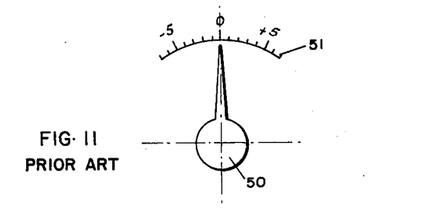
FIG. 11 shows the control of an "infinity adjustment" in a rangefinder-sight known to prior art in its neutral position when there is no instrumental error.
Figure 12:
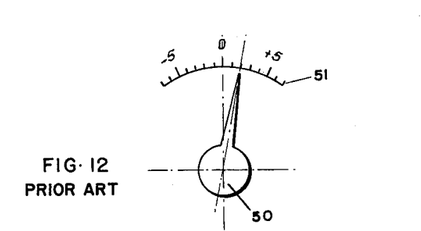
FIG. 12 shows the control of FIG. 11 set to correct a small instrumental error.

The rotating control knob 50 with pointer and an arbitrary fixed scale 51 of the known "infinity adjustment" deviator is illustrated in FIGS. 11 and 12; for the case where the instrument was found to operate properly (FIG. 11) and where it was found necessary to correct an instrumental error by setting the deviator in a position corresponding to a reading of two graduations on the arbitrary fixed scale (FIG. 12) respectively.

It follows that this deviator, known to prior art, performs the same basic physical function as the deviator according to my invention which is to deviate angularly, in the horizontal plane, one of the beams of the instrument by an adjustable amount. Yet the purpose of this function is solely to maintain the stability of the operation of the ranging system of the instrument and is therefore not related in any way to the function of the deviator according to my invention, whose purpose is to make the rangefinder-sight suitable for a plurality of ballistics of the associated firing weapon.

The difference between the purposes of the two deviators becomes still clearer if it is considered that an unstable rangefinder-sight can be corrected by a "zero adjustment" deviator known to prior art but will still remain suitable for only one set of ballistic conditions of the associated weapon unless fitted with another deviator designed to perform the novel function, according to my invention. Also a perfectly stable rangefinder-sight known to prior art in which there is no need at all for a "zero adjustment" deviator to correct possible subsequently developing faults of the ranging system, must still be fitted with a deviator according to my invention in order to cater for a plurality of ballistics.

The above line of thought leads to an alternative embodiment of my invention, which consists in modifying in a novel manner the driving mechanism of the "zero adjustment" deviators known to prior art so as to convert them into dual-function devices which would both correct possible faults in the ranging system of the rangefinder-sight which function is known to prior art, and would also perform the novel function of compensating for changes of ballistics of the associated weapon.

Figure 14:
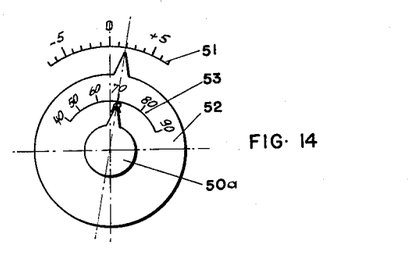
FIG. 14 shows the control of FIG. 13 set to correct a small instrumental error when the initial ballistics still prevail.
Figure 15:
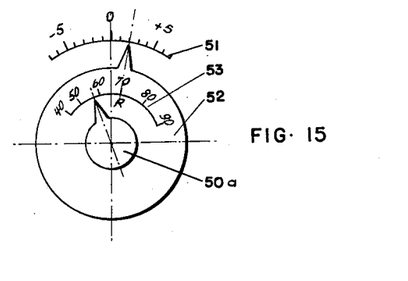
FIG. 15 shows the control of FIG. 13 set to correct a small instrumental error as per FIG. 14 and also to cater for modified ballistics.

The conventional deviator discussed with reference to FIGS. 11 and 12 is now converted into a dual-purpose deviator by supplementing its control mechanism in the manner shown in FIGS. 13, 14 and 15. The new element is a disk 52 on which a scale 53 calibrated in terms of the known factor which causes the changes in the ballistic curve is engraved, while the arbitrary scale of the "infinity adjustment" proper remains unchanged. To be specific it will be supposed that the rangefinder-sight was designed originally for a ballistic curve prevailing when the temperature of the repellant is 70° F., that the muzzle velocity and the ballastic vary with propellant temperature and that the instrument has to cater for ballistics prevailing at temperatures ranging from 30° F. to 90° F. It is supposed that the required increments $\Delta p$ of the deviation angle $p$ were computed according to the present invention and the corresponding settings of the adjustable deviator are marked on the scale or the disk as shown in FIGS. 13, 14 and 15 on which the temperature mark of 70° F. is supplemented with a letter R (for "Reference" temp.).

In the arrangement described, the disk 52 with the temperature scale 53 can either remain fixed by locking it to the body of the instrument while the control knob 50a of the deviator is rotated or else it can be locked to the knob and rotate with it.

The associated deviator is not shown but may be of any conventional type including the single rotatable wedge type or the pair of counter-rotating wedges type similar to those shown in FIGS. 18 and 17 respectively, but intended specifically for use as an "infinity adjustment" device for correcting errors of the ranging system of the instrument.

Figure 13:
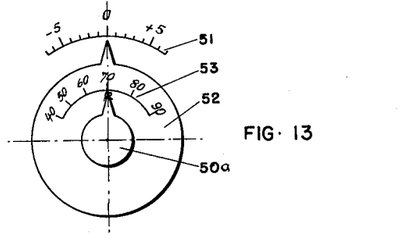
FIG. 13 shows the control of an "infinity adjustment" modified according to one embodiment of my invention in its neutral position where there is no instrumental error and when the initial ballistics prevail.

For initial factory alignment the setting is as shown in FIG. 13 and the disk 52 is fixed to the body of the instrument; the instrument leaves the factory in this condition. When the rangefinder-sight is used, the knob 50a is set to read on the scale 53 the temperature prevailing at the time of use.

For subsequent rechecking the instrument, the knob 50a is brought back to read the reference temperature of 70° F. as shown in FIG. 13 irrespective of the actually prevailing temperature. A lock (not shown) fixing the disk 52 to the body of the instrument is then released and the disk is locked to the knob, whereupon the alignment routine is carried out by training the instrument on a reference target or lath as described above and by checking for image-coincidence.

If the rangefinding system of the instrument is found to be out of alignment the matter is corrected by rotating the knob 50a together with the disk 52 until image-coincidence of the reference target is achieved. Suppose that in order to do so it becomes necessary to rotate the knob and disk by 2 graduations of the arbitrary "infinity-adjustment" scale 51, as shown in FIG. 14. The disk with the temperature scale is then again separated from the knob and is locked to the body of the instrument in this new position where it remains until such time when the alignment of the rangefinding mechanism will be rechecked, meanwhile the knob is set to read such temperatures as may prevail when the rangefinder-sight is used with the firing weapon. For instance the position of the control knob for a temperature of 57° F. is shown in FIG. 15.

In this description the actual mechanism operating the "infinity adjusting" optical deviator, the shape of the scales and the way of locking and unlocking the disk are immaterial. In fact any known method may be used. The essential fact is the use of the adjustable optical deviator for a dual purpose, one of which: the "infinity setting" is known to prior art, the other; the catering for a multiplicity of ballistics, is novel.

The method is perfectly accurate only if the relationship between the angular deviation increment $\Delta p$ and the displacement of the "infinity adjustment" control is linear. If it is not, the method is approximate only; I have found, however, that in practice the error is small enough to be neglected.

The principle of operation of the improvement according to the present invention and its preferred embodiments have been described. It remains to prove whether and to what extent the invention performs the function of catering for possible variations of the ballistics of the associated weapon. It is also the duty of the inventor to teach that magnitude of the additional angular deflection $\Delta p$ which should be selected to achieve optimum results in any given circumstances. To do this it is necessary to go into the theory of external ballistics of a firing weapon.

The mathematical formula expressing the magnitude of the tangent elevation angle E required to score a hit on a target located at a range R is the ballistic equation of the weapon and a graph representing said ballistic equation in Cartesian coordinates is the ballistic curve.

It is well known that the following formula is a close approximation of the ballistic equation:

$$E = \frac{g}{2v^2} \cdot R \left(1 + \frac{2}{3} \cdot r \cdot R\right) - j \qquad (4)$$

in the above formula:

$g$ is the gravity acceleration
$v$ is the muzzle velocity
$j$ is the angle of jump of the weapon
$r$ is the retardation coefficient of the projectile The retardation coefficient $r$ is defined by the formula:

$$r = \frac{c \cdot A \cdot h}{2 \cdot m}$$

in which:

$A$ is the cross-sectional area of the projectile
$c$ is the form factor of the projectile
$m$ is the mass of the projectile
$h$ is the air density Equation 4 is accurate enough for practical purposes if the muzzle velocity is lower than the speed of sound and if the target is approximately at the same level as the firing weapon.

It is seen from Equation 4 that the two factors which might affect the magnitude of the tangent elevation angle E required to score a hit on a target at a range R are: a possible change of the muzzle velocity $v$, or else a possible change of the retardation coefficient $r$. The former occurs if the amount or kind of the propellant charge is changed or if its rate of burning varies; the latter occurs if the projectile is changed.

The relation between the possible increments $\Delta v$ and $\Delta r$ of the quantities $v$ and $r$ and the resultant increment $\Delta E$ of the tangent elevation angle E is readily determined by writing the full differential of Equation 4. The result becomes:

$$\Delta E = \left(\frac{\delta E}{\delta v}\right) \cdot \Delta v + \left(\frac{\delta E}{\delta r}\right) \cdot \Delta r$$

$$= \frac{gR}{v^2} \left[ -\left(1 + \frac{2}{3} r \cdot R\right) \frac{\Delta v}{v} + \frac{R}{3} \cdot \Delta v \right] \qquad (5)$$

On the other hand the change of the parallax angle $p$ by an increment $\Delta p$ according to the present invention results in an increment $\Delta E_1$ of the tangent elevation angle E defined by $$\Delta E_1 = \left(\frac{\delta E}{\delta R}\right) \cdot \left(\frac{\delta R}{\delta p}\right) \cdot \Delta p \qquad (6)$$

The first and second partial differentials can be determined from Equations 4 and 1 respectively: The result becomes:

$$\left(\frac{\delta E}{\delta R}\right) = +\frac{g}{2v^2}\left(1 + \frac{4}{3}r \cdot R\right)$$

$$\left(\frac{\delta R}{\delta p}\right) = -\frac{qB}{p^2} = -\frac{R^2}{qB}$$

By substituting these expressions in Equation 6 we get:

$$\Delta E_1 = -\frac{qR}{v^2} \cdot \frac{R}{2qB} \cdot \left(1 + \frac{4}{3}v \cdot R\right) \cdot \Delta p \qquad (7)$$

It is seen that the increment $\Delta E_1$ which can be obtained according to my invention is not identical with the actual increment $\Delta E$ of the ballistic curve as defined by Equation 5, which means that my invention does not make it possible to compensate for any possible changes in the ballistic curve at all ranges and that a residual error $\epsilon$ is left. This error is defined by the equation:

$$\epsilon = \Delta E_1 - \Delta E \qquad (8)$$

By combining Equations 5, 7 and 8 we get:

$$\epsilon = \frac{gR}{v^2} \cdot \left[\left(1 + \frac{2}{3}r \cdot R\right)\frac{\Delta v}{v} - \frac{R}{3} \cdot \Delta r - \frac{R}{2qB}\left(1 + \frac{4}{3}r \cdot R\right) \cdot \Delta p\right] \qquad (9)$$

It is now seen that the residual error $\epsilon$ vanishes for two values of R: one is $R=0$, the other $R=R_0$ is a range at which the term in square brackets vanishes.

Figure 16:
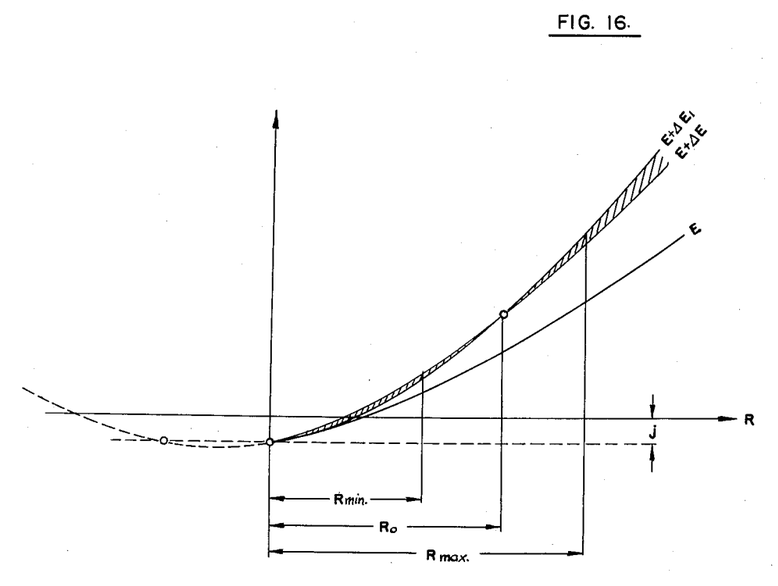
FIG. 16 is a plot in Cartesian coordinates of three ballistic curves showing tangent elevation angles versus range.

This is illustrated in FIG. 16 which is a graph in Cartesian coordinates showing a plot of three ballistic curves versus range. Only the portion of the graph corresponding to positive values of R has a physical significance. The first designated E is the ballistic curve of the weapon for which the rangefinder-sight was originally designed. The rangefinder-sight provides at all ranges the tangent elevation angle defined by this curve. The second curve marked $E+\Delta E$ is the changed ballistic curve of the weapon, due to a change of the muzzle velocity $v$ or retardation coefficient $r$ of the projectile or both. It is intended that the rangefinder-sight should provide tangent elevation angles as defined by this modified ballistic curve of the weapon.

The third curve designated $E+\Delta E_1$ is one of the plurality of tangent elevation versus range curves which the rangefinder-sight can provide, if fitted with the improvement according to the present invention. The residual errors $\epsilon$ of the tangent elevation angle are represented by the ordinates of the shaded area in the graph.

It is obvious that the range $R_0$ at which the curves $E+\Delta E$ and $E+\Delta E_1$ intersect and the residual error $\epsilon$ vanishes depends upon the choice of the deviation angle $\Delta p$ which is arbitrary, or—conversely—the value of the range $R_0$ can be selected arbitrarily, in which case the corresponding deviation angle $\Delta p$ can be determined from Equation 9 and is given by the expression:

$$\Delta p = \frac{2qB}{R_0} \cdot \frac{\Delta r - \left(\frac{3}{R_0} + 2r\right)\frac{\Delta v}{v}}{\frac{3}{R_0} - \frac{4}{3}r} \qquad (10)$$

It is also obvious that—for best results—the range $R_0$ should be selected between the minimum and maximum operational ranges of the weapon, whereupon the value of the additional deviation angle $\Delta p$ can be computed from Formula 9. The minimum and maximum operational ranges are designated in FIG. 16 by the symbols $R_{min}$ and $R_{max}$ respectively and for the sake of clearness of representation, the graph is drawn not to scale so as to exaggerate the magnitude of the residual error.

What I claim is:

1. In a rangefinder-sight of the type which is clamped athwart the barrel of a firing weapon in which the parallax angle subtended by two beams of light emanating from the target and entering each one of a pair of spaced windows is determined by bringing into proper relationship the two images of the target presented to an operator and formed each by one of said two beams of light, and the tangent elevation angle of the barrel as required by the ballistic curve of the weapon of any operational range corresponding to said parallax angle is automatically obtained by bringing the two images of the target into proper relationship, said rangefinder-sight including a first optical deviator mounted in the path of one of two beams of light, and means for actuating said first optical deviator to adjust said beam of light for ranging as required by a prescribed ballistic curve of the weapon; and a second optical deviator operably mounted to selectively and continuously adjust the beam of light from said first deviator so as to further deflect the said adjustable beam of light in the plane of the base of the rangefinder-sight by any adjustable angle for deliberately changing the said parallax angle and for producing a corresponding change in the setting of the instrument whereby the two images of the target are brought into proper relationship corresponding to any change in the tangent elevation angle of the barrel as a result of a change in the ballistic curve of the associated weapon.

2. A rangefinder-sight as set forth in claim 1 in which said second deviator comprises a wedge rotatably mounted in the said adjustable beam of light and means operable for rotating said wedge to further deflect said beam of light whereby the parallax angle of the first deviator is changed to meet said new ballistic curve so that further operation of the said first deviator deflects the adjustable light beam as required by the new ballistics of the weapon without the requirement of mechanical adjustment of the parallax angle of said first deviator.

3. A rangefinder-sight as set forth in claim 2 in which said adjustable means for said second deviator is provided with a scale and pointer, said scale being calibrated in terms of the factors which cause the ballistic curve to vary.

4. A rangefinder-sight as set forth in claim 1 in which said second deviator comprises a pair of counter-rotating wedges rotatably mounted in the said adjustable beam of light and means operable for rotating said pair of counter-rotating wedges to further deflect said beam of light whereby the parallax angle of the first deviator is changed to meet said new ballistic curve so that further operation of the said first deviator deflects the adjustable light beam as required by the ballistics of the weapon without the requirement of mechanical adjustment of the parallax angle of said first deviator.

5. A rangefinder-sight as set forth in claim 4 in which said adjustable means for said second deviator is provided with a scale and pointer, said scale being calibrated in terms of the factors which cause the ballistic curve to vary.

References Cited in the file of this patent

UNITED STATES PATENTS

| | | |
|---|---|---|
| 1,291,848 | Griffith | Jan. 21, 1919 |
| 2,155,389 | Arden | Apr. 25, 1939 |
| 2,157,548 | Leitz | May 9, 1939 |
| 2,401,700 | Mihalyi | June 4, 1946 |
| 2,426,812 | Bennett | Sept. 2, 1947 |
| 2,607,275 | Peterson | Aug. 19, 1952 |
| 2,655,832 | Mihalyi et al. | Oct. 20, 1953 |
| 2,719,454 | Nerwin | Oct. 4, 1955 |